(No Model.)

C. W. SLEEPER.
DEVICE FOR FEEDING AND CUTTING SOLDER.

No. 398,665. Patented Feb. 26, 1889.

Witnesses.
O. T. Davis.
W. B. Bardman

Inventor.
Charles W. Sleeper.

UNITED STATES PATENT OFFICE.

CHARLES W. SLEEPER, OF ISLAND POND, VERMONT.

DEVICE FOR FEEDING AND CUTTING SOLDER.

SPECIFICATION forming part of Letters Patent No. 398,665, dated February 26, 1889.

Application filed September 5, 1888. Serial No. 284,604. (No model.)

*To all whom it may concern:*

Be it known that I, CHARLES W. SLEEPER, a citizen of the United States, residing at Island Pond, in the county of Essex and State of Vermont, have invented a new and useful Device for Feeding and Cutting Solder, of which the following is a specification.

My invention relates to improvements in feeding and cutting solder for seaming-machines, and is designed to feed automatically from a roll of solder (substantially the width of the seam to be soldered and of any convenient thickness) the exact amount of solder required and to drop it upon the seam to be soldered. I attain these objects by means of the mechanism illustrated in the accompanying drawings, in which similar letters refer to similar parts throughout the several views.

Figure 1:
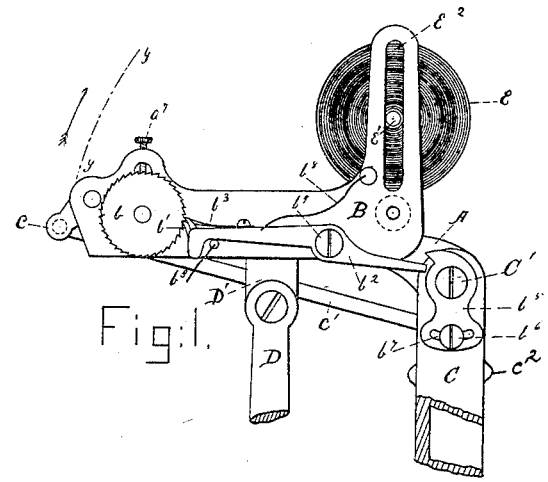
Figure 2:
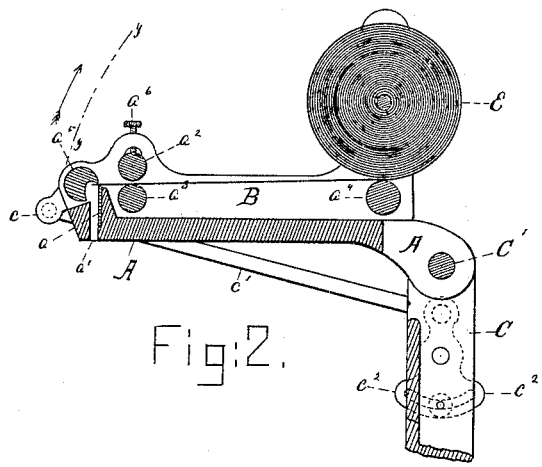
Figure 3:
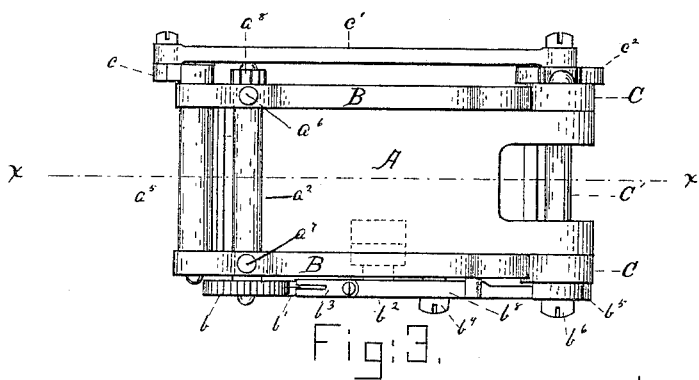

Figure 1 is a side elevation of the device, showing a portion only of standard C and arm D. Fig. 2 is a vertical section of same, taken at line $x$ $x$, Fig. 3. Fig. 3 is a plan of the device with the roll of solder E and carrier-roll $a^4$ removed.

My invention consists of a bed-piece, A, to which are secured two side plates, B B, in which are bearings for two feed-rolls, $a^2$ $a^3$, a carrier-roll, $a^4$, and a rolling cutter, $a^5$. Two pressure-screws, $a^6$ $a^7$, are provided for adjusting the upper feed-roll, $a^2$. Slots $E^2$ are provided to receive and guide the pin E', which passes through the center of the roll of solder, E. A steel knife or cutting-plate, $a$, is secured to the bed A, and an opening, $a'$, is provided for the escape of the solder after being cut off from the roll E.

A standard, C, must be provided for attaching the device to the machine upon which it is to be used, and the device is to be moved on the pin C' by an arm, D, having one end connected to the depending ear D' and the other end to some suitable cam or lever of the machine upon which it is to be used. The feed-rolls $a^2$ $a^3$ are geared together at one end, one gear only, $a^8$, Fig. 3, being shown. A ratchet-wheel, $b$, is secured to the roll $a^3$, and is actuated by two pawls, $b'$, which are attached to the lever $b^2$ and held in position by the double spring $b^3$. The lever $b^2$ has its bearing upon the stud $b^4$. An adjustable stop, $b^5$, is supported on the pin C', and is held in position by the screw $b^6$, which passes through the slot $b^7$. A spring, $b^8$, serves to hold the lever $b^2$ down upon the stop-pin $b^9$. An arm or crank, $c$, is attached to the rolling cutter $a^5$, and a connecting-rod, $c'$, connects the crank $c$ with the adjustable quadrant $c^2$.

In operation the device has an oscillating motion about the pin C' and in the direction of the dotted line $y$ $y$. A roll of solder, E, of ribbon form and uniform thickness, is placed between the side plates, B B, and is held in place by a pin, E', passed loosely through its center and through the slots $E^2$ in the side plates, B B. The roll of solder, E, rests its weight upon the carrier-roll $a^4$, and the end of the ribbon passes between the feed-rolls $a^2$ $a^3$. As the device moves upward in the direction of the arrow the cutting-roll $a^5$ is turned back by the connecting-rod $c'$, leaving an opening between the knife $a$ and the cutting-edge of the cutting-roll $a^5$. At the same time the end of the lever $b^2$ strikes the adjustable stop $b^5$, and causes a movement of the ratchet $b$, and consequently of the feed-rolls $a^2$ $a^3$. The movement of the feed-rolls $a^2$ $a^3$ causes the solder to move forward as far as necessary between the cutting-edges of the knife $a$ and the cutting-roll $a^5$. The amount of said forward movement is regulated by the adjustable stop $b^5$. As the device descends the spring $b^8$ forces the lever $b^2$ back to its former position, and the solder is cut off by the return of the cutting-roll $a^5$. The portion of solder cut off drops through the opening $a'$, which is made to coincide with the seam to be soldered.

The quadrant $c^2$ may be set to cut the solder at any desired position of the device.

I have described the device as moving in the direction of the dotted line $y$ $y$ upon the pin C', the standard C being stationary; but it is obvious that, if desired, the bed A could be stationary and the standard C used as a lever to operate.

What I claim as my invention, and desire to secure by Letters Patent, is—

1. The combination of the bed-plate A, the sides B B, the knife $a$, the rolls $a^2$ $a^3$ $a^4$, the cutting-roll $a^5$, and means for operating the movable parts, substantially as described, and for the purpose set forth.

2. The combination, with the bed-plate A, the sides B B, the knife $a$, the rolls $a^2$ $a^3$ $a^4$, the cutting-roll $a^5$, and means for operating the movable parts, of the ratchet-wheel $b$, the pawls $b'$, the lever $b^2$, and the adjustable stop $b^5$, substantially as described, and for the purpose set forth.

3. The combination, with the bed-plate A, the sides B B, the knife $a$, the rolls $a^2$ $a^3$ $a^4$, the cutting-roll $a^5$, and means for operating the movable parts, of the crank $c$, the connecting-rod $c'$, and the quadrant $c^2$, substantially as described, and for the purpose set forth.

CHARLES W. SLEEPER.

Witnesses:
O. G. DAVIS,
W. B. BOWMAN.